United States Patent
Sinha et al.

(10) Patent No.: US 9,137,568 B2
(45) Date of Patent: Sep. 15, 2015

(54) METHOD AND SYSTEM FOR LOGO IDENTIFICATION BASED ON AUTOMATIC CONTENT RECOGNITION

(71) Applicant: TURNER BROADCASTING SYSTEM, Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 160 days.

(21) Appl. No.: 13/730,422

(22) Filed: Dec. 28, 2012

(65) Prior Publication Data

US 2013/0212609 A1 Aug. 15, 2013

Related U.S. Application Data

(60) Provisional application No. 61/596,012, filed on Feb. 7, 2012.

(51) Int. Cl.
*H04N 7/16* (2011.01)
*H04N 21/44* (2011.01)
(Continued)

(52) U.S. Cl.
CPC ........ *H04N 21/44008* (2013.01); *G06F 3/0484* (2013.01); *G06F 17/30495* (2013.01);
(Continued)

(58) Field of Classification Search
CPC .............................................. H04N 21/44008
See application file for complete search history.

(56) References Cited

U.S. PATENT DOCUMENTS

| 5,305,464 A | 4/1994 | Frett |
| 5,410,326 A | 4/1995 | Goldstein |

(Continued)

FOREIGN PATENT DOCUMENTS

| EP | 1485815 | 10/2007 |
| EP | 1354276 | 12/2007 |

(Continued)

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.

(Continued)

*Primary Examiner* — Nathan Flynn
*Assistant Examiner* — Alfonso Castro
(74) *Attorney, Agent, or Firm* — Hopeton S. Walker; Loza & Loza, LLP

(57) ABSTRACT

A method and system for logo identification based on automatic content recognition (ACR) are described in which a connected television (TV) or other end-user device may be provided with instructions to fingerprint certain regions in a video frame to identify the source of the content being displayed. Such instructions may be provided when, for example, fingerprint matching is able to identify content that is provided by multiple sources but is unable to identify the particular source of the content. In those instances, one or more additional locations may be determined for taking fingerprints in the video frame. These locations correspond to region of the video frame in which a graphical item that represents the network television station is typically displayed. A profile with these locations is generated and sent to the connected TV to take additional fingerprints to enable the identification of the network television station providing content.

26 Claims, 9 Drawing Sheets

(51) Int. Cl.

| | | |
|---|---|---|
| *G06T 1/00* | (2006.01) | |
| *G06F 17/30* | (2006.01) | |
| *G06F 3/0484* | (2013.01) | |
| *H04N 21/442* | (2011.01) | |
| *H04N 21/4784* | (2011.01) | |
| *H04N 21/4722* | (2011.01) | |
| *H04N 21/478* | (2011.01) | |
| *H04N 21/441* | (2011.01) | |
| *H04N 21/81* | (2011.01) | |
| *H04N 21/432* | (2011.01) | |
| *H04N 21/00* | (2011.01) | |

(52) U.S. Cl.
CPC ............. *G06T1/0021* (2013.01); *H04N 21/00* (2013.01); *H04N 21/432* (2013.01); *H04N 21/441* (2013.01); *H04N 21/442* (2013.01); *H04N 21/478* (2013.01); *H04N 21/4722* (2013.01); *H04N 21/4784* (2013.01); *H04N 21/812* (2013.01)

(56) References Cited

U.S. PATENT DOCUMENTS

| | | |
|---|---|---|
| 5,437,050 A | 7/1995 | Lamb et al. |
| 5,712,995 A | 1/1998 | Cohn |
| 5,874,686 A | 2/1999 | Ghias et al. |
| 5,918,223 A | 6/1999 | Blum et al. |
| 5,956,683 A | 9/1999 | Jacobs et al. |
| 5,991,737 A | 11/1999 | Chen |
| 6,121,530 A | 9/2000 | Sonoda |
| 6,184,877 B1 | 2/2001 | Dodson et al. |
| 6,201,176 B1 | 3/2001 | Yourlo |
| 6,314,577 B1 | 11/2001 | Pocock |
| 6,408,272 B1 | 6/2002 | White et al. |
| 6,504,089 B1 | 1/2003 | Negishi et al. |
| 6,556,218 B1 | 4/2003 | Alcorn |
| 6,760,720 B1 | 7/2004 | De Bellis |
| 6,765,595 B2 | 7/2004 | Lee et al. |
| 6,834,308 B1 | 12/2004 | Ikezoye et al. |
| 6,968,337 B2 | 11/2005 | Wold |
| 6,990,453 B2 | 1/2006 | Wang et al. |
| 7,080,325 B2 | 7/2006 | Treibach-Heck et al. |
| 7,095,871 B2 * | 8/2006 | Jones et al. ................. 382/100 |
| 7,134,132 B1 | 11/2006 | Ngo |
| 7,174,293 B2 | 2/2007 | Kenyon et al. |
| 7,190,971 B1 | 3/2007 | Kawamoto |
| 7,194,752 B1 | 3/2007 | Kenyon et al. |
| 7,266,343 B1 | 9/2007 | Yli-juuti et al. |
| 7,363,278 B2 | 4/2008 | Schmelzer et al. |
| 7,444,353 B1 | 10/2008 | Chen et al. |
| 7,500,007 B2 | 3/2009 | Ikezoye et al. |
| 7,529,659 B2 | 5/2009 | Wold |
| 7,562,012 B1 | 7/2009 | Wold et al. |
| 7,562,392 B1 | 7/2009 | Rhoads et al. |
| 7,565,327 B2 | 7/2009 | Schmelzer |
| 7,624,416 B1 | 11/2009 | Vandermolen |
| 7,707,088 B2 | 4/2010 | Schmelzer |
| 7,711,652 B2 | 5/2010 | Schmelzer |
| 7,730,509 B2 | 6/2010 | Boulet et al. |
| 7,783,489 B2 | 8/2010 | Kenyon et al. |
| 7,797,249 B2 | 9/2010 | Schmelzer et al. |
| 7,813,954 B1 | 10/2010 | Price |
| 7,870,574 B2 | 1/2011 | Kenyon et al. |
| 7,877,290 B1 | 1/2011 | Arsenault |
| 7,877,438 B2 | 1/2011 | Schrempp et al. |
| 7,917,645 B2 | 3/2011 | Ikezoye et al. |
| 8,006,274 B2 | 8/2011 | Scott, III |
| 8,249,422 B2 | 8/2012 | Narahara et al. |
| 8,281,339 B1 | 10/2012 | Walker |
| 8,335,833 B1 | 12/2012 | Parkinson |
| 8,407,750 B2 | 3/2013 | Vorbau |
| 8,418,206 B2 | 4/2013 | Bryant et al. |
| 8,553,148 B2 | 10/2013 | Ramaswamy et al. |
| 8,810,512 B2 | 8/2014 | Andersson |
| 2002/0069100 A1 | 6/2002 | Arberman |
| 2002/0073419 A1 | 6/2002 | Yen |
| 2002/0078441 A1 | 6/2002 | Drake |
| 2002/0083060 A1 | 6/2002 | Wang et al. |
| 2002/0120925 A1 | 8/2002 | Logan |
| 2002/0178447 A1 | 11/2002 | Plotnick |
| 2003/0002638 A1 | 1/2003 | Kaars |
| 2003/0035075 A1 | 2/2003 | Butler et al. |
| 2003/0055699 A1 | 3/2003 | O'Connor |
| 2003/0056101 A1 * | 3/2003 | Epstein ........................ 713/176 |
| 2003/0101451 A1 | 5/2003 | Bentolila |
| 2003/0149975 A1 | 8/2003 | Eldering |
| 2003/0154475 A1 | 8/2003 | Rodriguez |
| 2003/0172381 A1 | 9/2003 | Janevski |
| 2004/0003397 A1 | 1/2004 | Boston et al. |
| 2004/0034874 A1 | 2/2004 | Hord |
| 2004/0068737 A1 | 4/2004 | Itoh et al. |
| 2004/0143349 A1 | 7/2004 | Roberts |
| 2004/0143845 A1 | 7/2004 | Lin |
| 2004/0189710 A1 | 9/2004 | Goulden |
| 2004/0210847 A1 | 10/2004 | Berson |
| 2005/0097599 A1 | 5/2005 | Plotnick et al. |
| 2005/0149968 A1 | 7/2005 | Konig |
| 2005/0235307 A1 | 10/2005 | Relan |
| 2005/0278731 A1 | 12/2005 | Cameron |
| 2006/0015923 A1 | 1/2006 | Chuah |
| 2006/0026636 A1 | 2/2006 | Stark et al. |
| 2006/0031684 A1 | 2/2006 | Sharma et al. |
| 2006/0187358 A1 | 8/2006 | Lienhart |
| 2006/0195860 A1 * | 8/2006 | Eldering et al. ................. 725/19 |
| 2006/0282847 A1 | 12/2006 | Gupte |
| 2007/0078009 A1 | 4/2007 | Lockton |
| 2007/0192784 A1 | 8/2007 | Postrel |
| 2007/0250901 A1 | 10/2007 | McIntire |
| 2008/0104634 A1 | 5/2008 | Gajdos et al. |
| 2008/0127253 A1 | 5/2008 | Zhang |
| 2008/0227436 A1 | 9/2008 | Gantman |
| 2008/0244640 A1 | 10/2008 | Belleguie |
| 2008/0250447 A1 | 10/2008 | Rowe |
| 2008/0305815 A1 | 12/2008 | McDonough |
| 2008/0310731 A1 | 12/2008 | Stojancic et al. |
| 2008/0313140 A1 | 12/2008 | Pereira et al. |
| 2009/0009532 A1 | 1/2009 | Hallberg |
| 2009/0064261 A1 | 3/2009 | Jung |
| 2009/0077489 A1 | 3/2009 | Homma |
| 2009/0106104 A1 | 4/2009 | Upendran et al. |
| 2009/0119723 A1 | 5/2009 | Tinsman |
| 2009/0133049 A1 | 5/2009 | Bradley |
| 2009/0150930 A1 | 6/2009 | Sherwin et al. |
| 2009/0235317 A1 | 9/2009 | Igarashi |
| 2009/0288113 A1 | 11/2009 | Skinner |
| 2009/0317053 A1 | 12/2009 | Morley |
| 2009/0318114 A1 | 12/2009 | Bertoni |
| 2009/0327894 A1 | 12/2009 | Rakib |
| 2010/0007797 A1 | 1/2010 | Stojancic |
| 2010/0043040 A1 | 2/2010 | Olsen |
| 2010/0095337 A1 | 4/2010 | Dua |
| 2010/0121691 A1 | 5/2010 | Shifflett et al. |
| 2010/0125498 A1 | 5/2010 | Jaramillo |
| 2010/0158391 A1 | 6/2010 | Cunningham |
| 2010/0162344 A1 | 6/2010 | Casagrande et al. |
| 2010/0169906 A1 | 7/2010 | Takahashi |
| 2010/0175078 A1 | 7/2010 | Knudson |
| 2010/0205628 A1 | 8/2010 | Davis et al. |
| 2010/0269128 A1 | 10/2010 | Gordon |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2011/0067046 A1 | 3/2011 | Cox et al. |
| 2011/0067066 A1 | 3/2011 | Barton |
| 2011/0078729 A1 | 3/2011 | Lajoie et al. |
| 2011/0078733 A1 | 3/2011 | Lee |
| 2011/0088063 A1 | 4/2011 | Ben-Romdhane et al. |
| 2011/0122255 A1 | 5/2011 | Haritaoglu |
| 2011/0177775 A1 | 7/2011 | Gupta et al. |
| 2011/0191806 A1 | 8/2011 | Knudson et al. |
| 2011/0219419 A1 | 9/2011 | Reisman |
| 2011/0283322 A1 | 11/2011 | Hamano |
| 2011/0283327 A1 | 11/2011 | Zhu |

(56) References Cited

U.S. PATENT DOCUMENTS

| | | |
|---|---|---|
| 2011/0289114 A1 | 11/2011 | Yu et al. |
| 2011/0289524 A1 | 11/2011 | Toner |
| 2011/0311095 A1* | 12/2011 | Archer .................. 382/100 |
| 2011/0313856 A1 | 12/2011 | Cohen et al. |
| 2011/0314495 A1 | 12/2011 | Zenor |
| 2012/0017236 A1 | 1/2012 | Stafford et al. |
| 2012/0042334 A1 | 2/2012 | Choi |
| 2012/0096491 A1 | 4/2012 | Shkedi |
| 2012/0117584 A1 | 5/2012 | Gordon |
| 2012/0124625 A1 | 5/2012 | Foote |
| 2012/0144416 A1 | 6/2012 | Wetzer |
| 2012/0167133 A1* | 6/2012 | Carroll et al. ............. 725/32 |
| 2012/0174157 A1 | 7/2012 | Stinson |
| 2012/0185895 A1 | 7/2012 | Wong et al. |
| 2012/0192227 A1 | 7/2012 | Fleischman |
| 2012/0215789 A1 | 8/2012 | Ramanathan |
| 2012/0246693 A1 | 9/2012 | Iqbal |
| 2012/0303442 A1 | 11/2012 | Patwa |
| 2012/0311618 A1 | 12/2012 | Blaxland |
| 2012/0317240 A1 | 12/2012 | Wang |
| 2012/0331496 A1 | 12/2012 | Copertino |
| 2013/0019262 A1 | 1/2013 | Bhatia et al. |
| 2013/0047178 A1 | 2/2013 | Moon |
| 2013/0125163 A1 | 5/2013 | Chen et al. |
| 2013/0132999 A1 | 5/2013 | Pandey |
| 2013/0162902 A1 | 6/2013 | Musser |
| 2013/0163957 A1 | 6/2013 | Ikizyan |
| 2013/0198768 A1 | 8/2013 | Kitazato |
| 2013/0208942 A1 | 8/2013 | Davis |
| 2013/0222597 A1 | 8/2013 | Brink |
| 2013/0305335 A1 | 11/2013 | Syed et al. |
| 2013/0332951 A1 | 12/2013 | Gharaat |
| 2013/0339999 A1 | 12/2013 | Sangiovanni |
| 2014/0082659 A1 | 3/2014 | Fife |
| 2014/0150022 A1 | 5/2014 | Oh |
| 2014/0164994 A1 | 6/2014 | Myslinski |
| 2014/0307931 A1 | 10/2014 | Gierahn et al. |

FOREIGN PATENT DOCUMENTS

| | | |
|---|---|---|
| JP | 11055201 | 2/1999 |
| WO | WO9517746 | 6/1995 |

OTHER PUBLICATIONS

Blackburn, Steven G., "Search by Humming," University of Southampton Faculty of Engineering, Department of Electronics and Computer Science, May 8, 1997.

Ghias, Asif et al, "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

\* cited by examiner

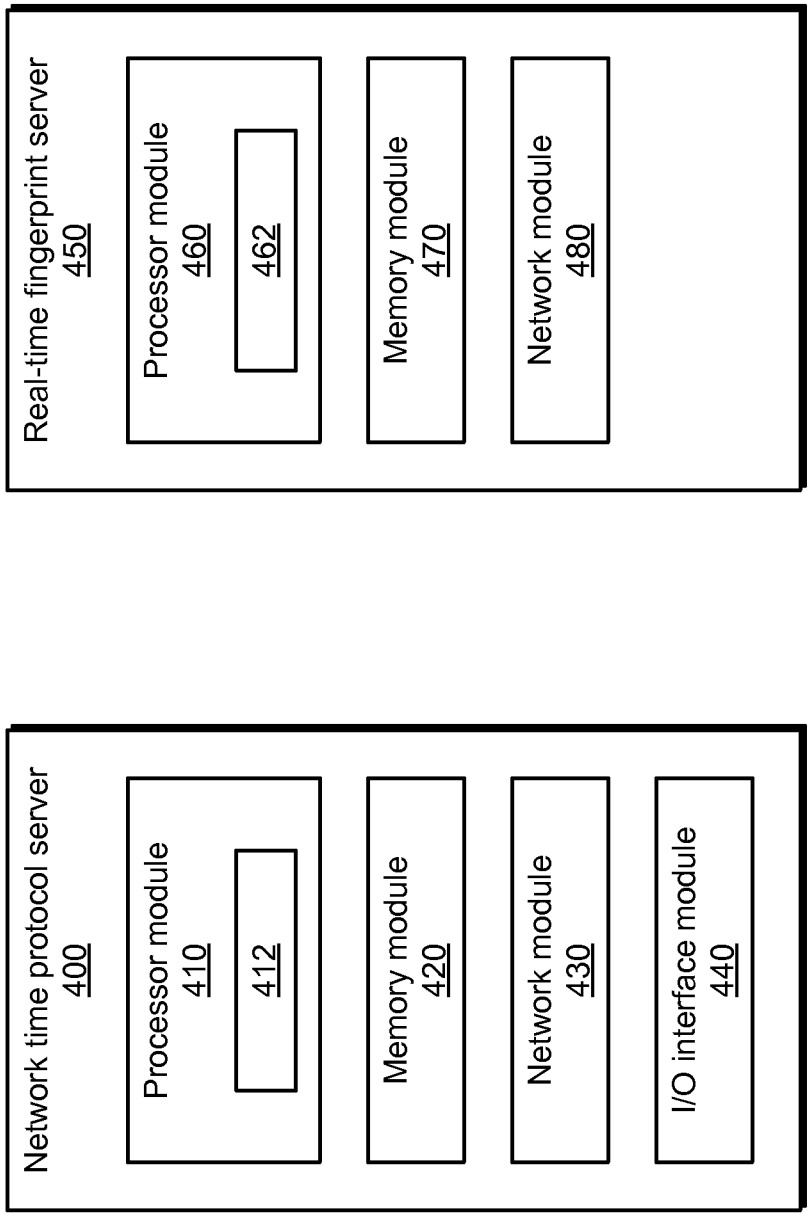

METHOD AND SYSTEM FOR LOGO IDENTIFICATION BASED ON AUTOMATIC CONTENT RECOGNITION

CROSS-REFERENCE TO RELATED APPLICATIONS/INCORPORATION BY REFERENCE

This application makes reference to, claims priority to, and claims the benefit of U.S. provisional application 61/596,012, filed on Feb. 7, 2012.

This application also makes reference to:
U.S. patent application Ser. No. 13/730,359, filed Dec. 28, 2012;
U.S. patent application Ser. No. 13/730,459 filed Dec. 28, 2012;
U.S. patent application Ser. No. 13/730,495, filed Dec. 28, 2012;
U.S. patent application Ser. No. 13/730,530, filed Dec. 28, 2012;
U.S. patent application Ser. No. 13/730,754, filed Dec. 28, 2012;
U.S. patent application Ser. No. 13/730,559, filed Dec. 28, 2012;
U.S. patent application Ser. No. 13/730,579, filed Dec. 28, 2012;
U.S. patent application Ser. No. 13/730,593, filed Dec. 28, 2012;
U.S. patent application Ser. No. 13/730,759, filed Dec. 28, 2012;
U.S. patent application Ser. No. 13/730,627, filed Dec. 28, 2012;
U.S. patent application Ser. No. 13/730,644, filed Dec. 28, 2012;
U.S. patent application Ser. No. 13/730,656, filed Dec. 28, 2012;
U.S. patent application Ser. No. 13/730,670, filed Dec. 28, 2012;
U.S. patent application Ser. No. 13/730,691, filed Dec. 28, 2012;
U.S. patent application Ser. No. 13/730,702, filed Dec. 28, 2012;
U.S. patent application Ser. No. 13/730,718, filed Dec. 28, 2012; and
U.S. patent application Ser. No. 13/730,734, filed Dec. 28, 2012.

Each of the above referenced applications is hereby incorporated herein by reference in its entirety.

FIELD OF TECHNOLOGY

Certain embodiments of the invention relate to digital audio/video content recognition. More specifically, certain embodiments of the invention relate to a method and system for logo identification based on automatic content recognition.

BACKGROUND

Smart or connected televisions (TVs) may receive data from data networks that allow a viewer to not only access broadcast digital content, but to also receive multimedia content.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for logo identification based on automatic content recognition, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 4A and 4B are each a flow diagram that illustrates exemplary steps in the operation of an automatic content recognition system with an abstraction layer, in accordance with embodiments of the invention.

DETAILED DESCRIPTION OF THE INVENTION

Figure 1:
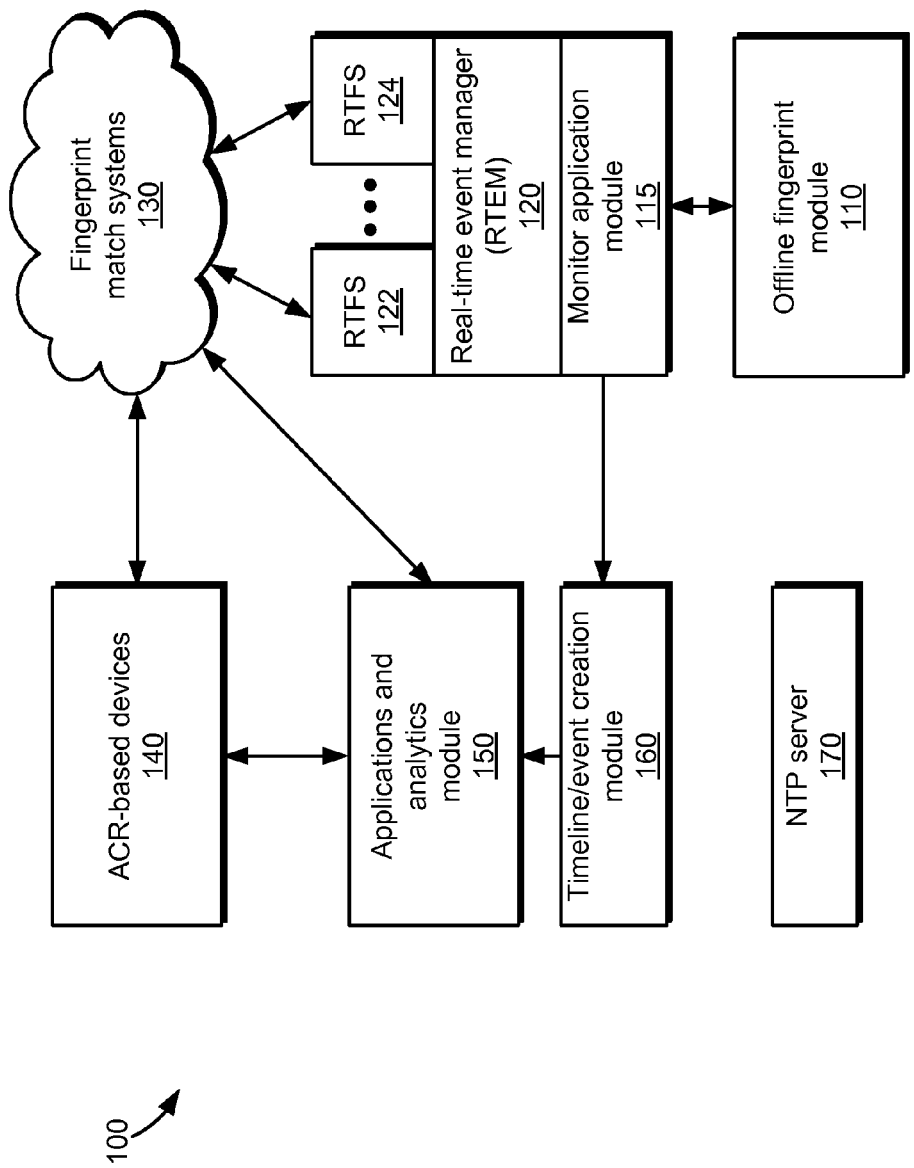
FIG. 1 is a high-level block diagram that illustrates an exemplary automatic content recognition system utilized for logo identification, in accordance with an embodiment of the invention.

Certain embodiments of the invention may be found in a method and system for an automatic content recognition (ACR) abstraction layer. Various embodiments of the invention provide for a system architecture that implements the ACR abstraction layer based on utilizing a real-time event manager (RTEM) to communicate with multiple fingerprint servers. The RTEM can operate as a triggering mechanism that provides events (i.e., event identifier and corresponding data) to the multiple fingerprint servers (RTFS's), each of which associates the event(s) to the corresponding fingerprints of the broadcast network. Each RTFS may employ a different fingerprinting technology. At least portions of the system architecture can be synchronized using a network/broadcast time server, which is also referred to as a network protocol time (NTP) server. That is, the RTEM and the fingerprinting servers can operate based on a common reference clock provided by the NTP server. Each of the fingerprint servers may generate a set of video fingerprints in real time from a network television feed by utilizing a video fingerprint technology that is different from the technology utilized by any of the other fingerprint servers. The different fingerprinting technologies may be from different fingerprinting vendors, for example. The fingerprint servers may also be referred to as real-time fingerprint servers (RTFSs). A monitor application in the ACR system may be operable to assign one or more interactive event identifiers to the RTEM by associating an NTP broadcast time to a fingerprint that is then propagated to other fingerprint systems (e.g., fingerprint servers) via an application programming interface (API). The fingerprint servers may communicate the sets of video fingerprints and interactive event identifiers to corresponding fingerprint match systems, which in turn may communicate with devices that utilize the same video fingerprint technology as the corresponding fingerprint server.

The assignment of the event identifiers is based on a broadcast NTP time corresponding to each identified event. The event identifiers may provide information about different interactive events that may take place in a connected or smart TV. A connected TV may refer to, for example, a television that has internet access and/or is capable of running applications. The event identifiers may also be referred to as interactive event identifiers (IDs), for example. The event identifiers may be determined in real time from a director's input for live programming, apriori from a predetermined network schedule, or from previously ingested content with interactivity defined (e.g., offline content). When determined from previously ingested content, the interactive event identifiers may be determined using a video fingerprinting process that is separate from those utilized by the fingerprint servers. This process may rely on any of the video fingerprinting technologies utilized by the fingerprint servers or on a different technology altogether The abstraction layer may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors.

Fingerprinting, and more particularly ACR fingerprinting, may refer to a process by which features of a video frame or a set thereof, and/or of an audio frame or a set thereof, may be analyzed to create representations (i.e., fingerprints) for each piece of content, for example. The fingerprints may be unique to each piece or sequence of content and may be highly robust against broadcast distortions such as re-encoding, aspect ratio, frame rate, up/down conversion, and pitch correction, to name a few. The fingerprints may be stored in a reference database in the ACR system such that unidentified content (e.g., content from a live network television feed or broadcast) may be identified by comparing fingerprints taken of the unidentified content with the stored fingerprints.

Once the event identifiers have been assigned by the monitor application and communicated to the real-time fingerprint servers via the real-time event manager, the real-time fingerprint servers may communicate the video fingerprints and the assigned event identifiers to corresponding fingerprint match systems. In some instances, the fingerprint match systems may be operated by a third party (e.g., television manufacturers, vendors etc.) as hosted services over the Internet (e.g., cloud computing, etc.). Each of the fingerprint match systems may communicate with devices (e.g., connected TVs, tablets, smartphones, etc.) that utilize the same video fingerprint technology utilized by the fingerprint server that corresponds to that fingerprint match system. These devices may be referred to as viewer or end user devices, for example.

The fingerprint match systems receive video fingerprints from the end-user devices and compare them to the ones received from the real-time fingerprint servers. When a match occurs, the fingerprint match systems may notify the end-user devices that an interactive event is to take place if there is an event identifier that corresponds to the matched video fingerprints.

As described above, automatic content recognition may be utilized across several platforms, including connected TVs from various manufacturers as well as smartphones and tablets. Since television viewing may be rapidly evolving from a single-screen experience to a multiple-screen experience, television networks may need to automatically identify the context of what a viewer is watching and the time in the program, both during a live television broadcast and in subsequent viewings such as when a program is being reproduced by a digital video recorder (DVR). In multi-screen viewing experiences, for example, companion applications on second-screen devices may also be utilized to interact with the television programming by using fingerprint technology that is available in the second-screen device or by pairing the second-screen device with the connected TV.

Having the ability to identify context and program timing may enable a network to increase audience engagement, extend viewing times, and provide program sponsors additional ways to engage with the audience, such as offering viewers personalized advertising offers or creating a second-screen experience during an advertisement break. These features may be implemented by having a central video fingerprint repository and management platform that facilitates triggering interactive events across various platforms regardless of the ACR vendor solution (e.g., fingerprinting technology). For example, an ACR system may utilize a single broadcast ACR solution to support connected TVs from multiple vendors as well as second-screen devices running companion applications.

There may be instances in which the vendors of connected TVs and supporting services are not able to associate an event with a fingerprint. Instead, those vendors may support the association of the content being viewed with a timeline. Accordingly, an ACR system may need to support timeline association in addition to event-to-fingerprint association. For timeline association, for example, the ACR system may be operable to create and provide a timeline that spans the duration of a program or show. The timeline can be distributed to the corresponding connected TVs supported by the vendors through vendor servers. With the timeline available, the connected TV can launch an event when the appropriate point in the timeline is reached.

Below are described various examples of aspects related to an ACR system that utilizes an architecture based on the abstraction layer. These exemplary aspects may comprise the system architecture, processes, APIs, and/or web-based services.

FIG. 1 is a high-level block diagram that illustrates an exemplary automatic content recognition system utilized for logo identification, in accordance with an embodiment of the invention. Referring to FIG. 1, there is shown an ACR system 100 that implements an abstraction layer to support fingerprinting technology from multiple vendors. The ACR system 100 is operable to support fingerprinting technology from multiple vendors and may be utilized to identify a network television station that provides content for display on a viewing screen based on the logo, symbol, sign, watermark, and/or text that are typically utilized to represent the network television station.

The ACR system 100 may comprise an offline fingerprint module 110, a monitor application module 115, a real-time event manager (RTEM) 120, a plurality of RTFSs 122, . . . , 124, fingerprint match systems 130, end-user devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, . . . , 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 . . . 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the Real-time event manager 120 may be operable to generate one or more signals that provide instructions to the RTFSs 122, . . . , 124 to enable the identification of a network television station based on the logo, symbol, sign, watermark, and/or text that are typically utilized to represent the network television station. The instructions may be related to information that is to be generated and/or provided to the end-user devices 140 for network television station identification. The instructions may indicate the type of information that is to be provided to the end-user devices 140 and/or when such information is to be provided. In some instances, a portion of the ACR system 100 other than the Real-time event manager 120, or in conjunction with the Real-time event manager 120, may generate the signals for providing instructions to the RTFSs 122, . . . , 124.

The RTFSs 122, . . . , 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, . . . , 124 may be a dedicated server for each of the fingerprint technologies supported by the ACR system 100. In some embodiments of the invention, a portion of the RTFSs 122, . . . , 124 may be operable to perform video fingerprinting while the remaining portion of the RTFSs 122, . . . , 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the RTFSs 122, . . . , 124 may be operable to receive one or more signals from the Real-time event manager 120 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 140 to take fingerprints of the video content being displayed on a viewing screen. In some instances, at least a portion of the fingerprinting locations may be provided by the Real-time event manager 120 and/or by another portion of the ACR system 100 through the instructions received by the RTFSs 122, . . . , 124. In other instances, the fingerprinting locations may be determined by the RTFSs 122, . . . , 124 based on locally and/or remotely stored information. Each fingerprinting location may comprise coordinates in a video frame (e.g., x coordinates, y coordinates) that indicate a particular region in the video frame to fingerprint.

The RTFSs 122, ..., 124 may provide the fingerprinting locations for communication to the end-user devices 140, for example, in the form of fingerprint profiles. The fingerprint profiles may comprise fingerprinting locations and/or other information to be utilized by an end-user device for ACR fingerprinting. In some instances, the fingerprint profiles may be generated by the RTFSs 122, ..., 124 in response to the instructions received. In other instances, the fingerprint profiles comprising the fingerprinting locations may be received by the RTFSs 122, ..., 124 from the Real-time event manager 120 and/or from another portion of the ACR system 100. The fingerprint profile of a particular end-user device 140 may be updated based on an indication that additional and/or different locations may be needed during fingerprinting to identify the network television station logo or symbol being displayed on a viewing screen at the end-user device 140. The update may be generated by the corresponding RTFS and then communicated to the end-user device 140 or may be received by the corresponding RTFS from the Real-time event manager 120 and/or from another portion of the ACR system 100 and then communicated to the end-user device 140.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 140. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the RTFSs 122, ..., 124 may be operable to communicate fingerprint profiles and/or fingerprint profile updates to the end-user devices 140 through the fingerprint match systems 130. Feedback and/or queries from the end-user devices 140 may be received by the RTFSs 122, ..., 124 for processing. The RTFSs 122, ..., 124 may in turn communicate information corresponding to the feedback and/or queries from the end-user devices 140 to the Real-time event manager 120 and/or to another portion of the ACR system 100 for further processing.

The fingerprint match systems 130 may comprise suitable logic, circuitry, code, and/or interfaces that may be operable to enable hosted services in the Internet for matching fingerprints produced by the RTFSs 122, ..., 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, ..., 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

The applications and analytics module 150 may comprise suitable logic, circuitry, code, and/or interfaces that may be operable to provide data to the end-user devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate End-user devices 140 that may not support event-to-fingerprint association. Once the End-user devices 140 have the timeline for a particular program or show, they may monitor the program or show, relative to the timeline, and launch appropriate event requests when a specified point in the timeline indicates that a particular event is to take place.

Communication between the RTFSs 122, ..., 124, and the fingerprint match systems 130 may occur through one or more wireless and/or wireline communication links. Similarly, communications between the fingerprint match systems 130 and the end-user devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, . . . , 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, . . . , 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, . . . , 124 may communicate the event identifiers and the fingerprints to its corresponding one of the fingerprint match systems 130. The fingerprint match systems 130 in turn receive fingerprints from their corresponding end-user devices 140 and try to match those fingerprints to the ones received from their corresponding RTFSs 122, . . . , 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event.

In operation, the ACR system 100 may generate a fingerprint profile that may be communicated to one of the end-user devices 140. The fingerprint profile may be communicated through one or more of the Real-time event manager 120, one of the RTFSs 122, . . . , 124, and one of the fingerprint match systems 130. The fingerprint profile may comprise locations where the end-user device is to take fingerprints of the video content being reproduced by the device. Once the content is identified based on the fingerprints taken and subsequently matched in the corresponding fingerprint match system 130, it may be determined that the source of the content is not known. Knowing the source of the content may be needed in some instances to enable interactive events associated with that source on the end-user device. Otherwise, an interactive event from, for example, one network television station may occur when a viewer is watching programming provided by a different network television station.

When the source of the content is not known, the end-user device may automatically utilize additional locations provided in the fingerprint profile or in a fingerprint profile update. These locations may correspond to the region in the video frame where the network television station logo or symbol is typically placed. Once these fingerprints are taken, they may be compared to fingerprints of the network television station logo or symbol at the corresponding fingerprint match systems 130. When a match occurs and the logo is identified, the end-user device may be able to receive interactive event identifiers from the corresponding RTFS. Once these interactive event identifiers are received, the end-user device may communicate with the applications and analytics module 150 to enable the interactive events to occur.

Figure 2A:
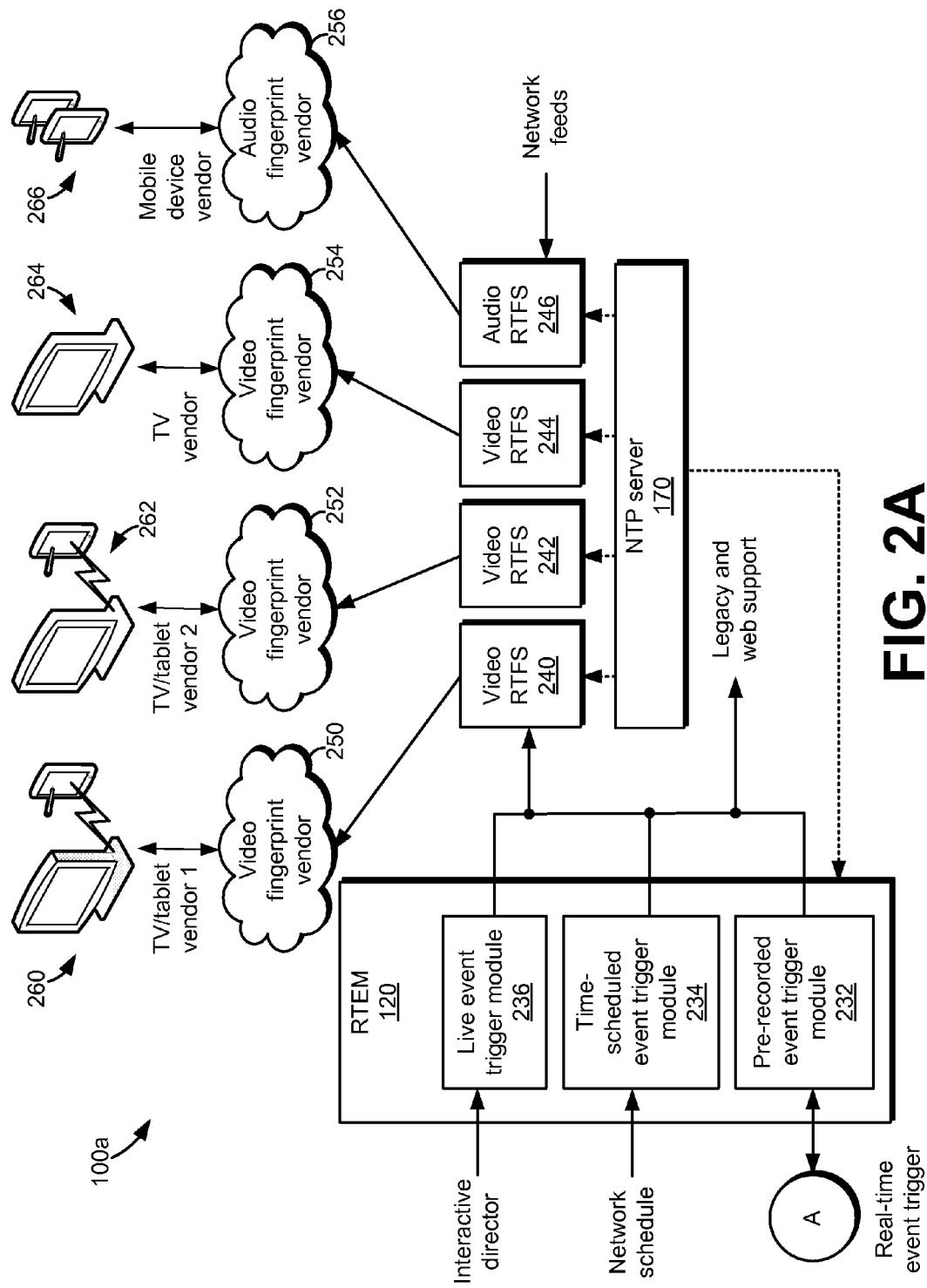
FIGS. 2A and 2B are each a block diagram that illustrates details of the exemplary automatic content recognition system utilized for logo identification shown in FIG. 1, in accordance with embodiments of the invention.
Figure 2B:
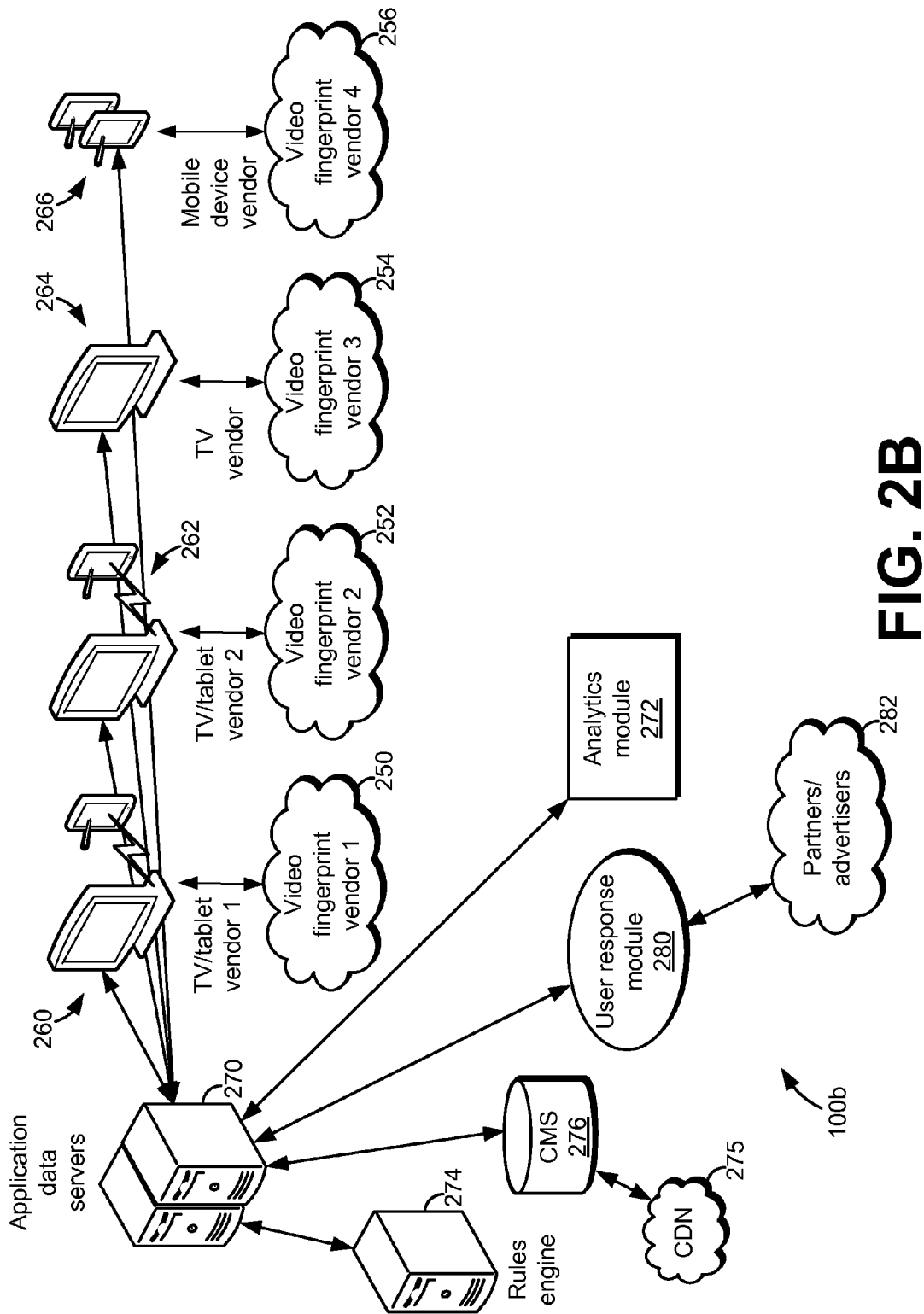

FIGS. 2A and 2B are each a block diagram that illustrates details of the exemplary automatic content recognition system utilized for logo identification shown in FIG. 1, in accordance with embodiments of the invention. Referring to FIG. 2A, there is shown a portion 100a of the ACR system 100 shown above with respect to FIG. 1 that may comprise the RTEM 230, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2A are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2A. The NTP server 170 of FIG. 1 is shown providing reference timing to the RTEM 230 and the RTFSs 240, 242, 244, and 246.

Also shown in FIG. 2A are various end-user devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example.

The end-user devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the end-user devices 260. These services may comprise video fingerprint matching as well as the delivery of any interactive event IDs associated with a match. The services may also comprise the communication of fingerprint profiles and/or other related information to the end-user devices 260 and/or the reception of feedback and/or queries from the end-user devices 260 to be communicated to the video RTFS 240. In addition, the video fingerprint vendor 250 may provide a network television station identifier and/or network timing information (e.g., heartbeat message or NTP-based network timestamp) that may be utilized by the end-user devices 260 for ACR-related applications and/or to maintain synchronization with the network television feed. The end-user devices 260 may comprise suitable logic, circuitry, code, and/or interfaces that may be operable to take and send video fingerprints to the video fingerprint vendor 250 for matching.

The end-user devices 262 may be operable to utilize the same video fingerprinting technology utilized by the video RTFS 242 and supported by the video fingerprint vendor 252. The video fingerprinting technology utilized by the end-user devices 262 may be different from that utilized by the end-user devices 260. The video fingerprint vendor 252 may be a vendor, manufacturer, or other third-party service provider that may comprise suitable logic, circuitry, code, and/or interfaces operable to provide hosted services over the internet for the end-user devices 262. These services may comprise video fingerprint matching as well as the delivery of any interactive event IDs associated with a match. The services may also comprise the communication of fingerprint profiles and/or other related information to the end-user devices 262 and/or the reception of feedback and/or queries from the end-user devices 262 to be communicated to the video RTFS 242. In addition, the video fingerprint vendor 252 may provide a network television station identifier and/or network timing information that may be utilized by the end-user devices 262 for ACR-related applications and/or to maintain synchronization with the network television feed. The end-user devices 262 may comprise suitable logic, circuitry, code, and/or interfaces that may be operable to take and send video fingerprints to the video fingerprint vendor 252 for matching.

The end-user devices 260 and 262 may be operable with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality.

The end-user devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the end-user devices 264. These services may comprise video fingerprint matching as well as the delivery of any interactive event IDs associated with a match. In addition, the video fingerprint vendor 254 may provide a network television station identifier and/or network timing information that may be utilized by the end-user devices 264 for ACR-related applications and/or to maintain synchronization with the network television feed. The end-user devices 264 may comprise suitable logic, circuitry, code, and/or interfaces that may be operable to take and send video fingerprints to the video fingerprint vendor 254 for matching.

The end-user devices 266 may utilize the same audio fingerprinting technology (e.g., audio ACR) utilized by the audio RTFS 246 and supported by the audio fingerprint vendor 256. The end-user devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the end-user devices 266. These services may comprise audio fingerprint matching as well as the delivery of any interactive event IDs associated with a match. The services may also comprise the communication of audio fingerprint profiles and/or other related information to the end-user devices 266 and/or the reception of feedback and/or queries from the end-user devices 266 to be communicated to the audio RTFS 246. Audio fingerprint profiles may comprise information related to the characteristics (e.g., segments, frequencies) of the audio fingerprints to be taken by the end-user devices 266. In addition, the audio fingerprint vendor 256 may provide a network television station identifier and/or network timing information that may be utilized by the end-user devices 260 for ACR-related applications and/or to maintain synchronization with the network television feed. The end-user devices 266 may comprise suitable logic, circuitry, code, and/or interfaces that may be operable to take and send audio fingerprints to the audio fingerprint vendor 256 for matching.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding end-user devices. The RTFSs 240, . . . , 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTFSs 240, . . . , 246 may be operable to handle instructions and/or information that enable the identification of a network television station based on the logo, symbol, sign, watermark, and/or text that are typically utilized to represent the network television station. In this regard, the RTFSs 240, . . . , 246 may be operable to handle instructions and/or information as described above with respect to the RTFSs 122, . . . , 124 that are illustrated in FIG. 1, for example.

The RTEM 230 may comprise suitable logic, circuitry, code, and/or interfaces that may be operable to perform real-time event triggering. In this regard, the RTEM 230 may be operable to manage real-time events based on inputs from different sources. For example, the RTEM 230 may comprise a pre-recorded event trigger module 232 to provide real-time triggering from the monitor application module 115 (shown in FIG. 1), a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via, for example, defined APIs to fingerprints generated as the network television feeds are fingerprinted by the RTFSs 240, . . . , 246.

The time-scheduled event trigger module 234 may be operable to receive a network or broadcast schedule and to assign, based on the network schedule, interactive events to fingerprints generated as the network television feed is fingerprinted by the RTFSs 240, . . . , 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 230 may also be operable to trigger interactive events in legacy television systems and/or in web-based systems. The infrastructure provided by the RTEM 230 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 230 may be operable to assign interactive event IDs to particular fingerprints in a sequence of audio or video fingerprints generated by the RTFSs 240, ..., 246. The RTEM 230 may also be operable to provide television network station identifiers and/or network timing information associated with any sequence of fingerprints.

In the example shown in FIG. 2B, the RTFSs 240, ..., 246 may correspond to the RTFSs 122, ..., 124, the fingerprint vendors 250, ..., 256 may correspond to the fingerprint match systems 130, and the end-user devices 260, ..., 266 may correspond to the end-user devices 140, which are illustrated in FIG. 1.

The RTEM 230 may be operable to handle instructions and/or information that enable the identification of a network television station based on the logo, symbol, sign, watermark, and/or text that are typically utilized to represent the network television station. In this regard, the Real-time event manager 230 may be operable to handle instructions and/or information as described above with respect to the Real-time event manager 120 that is illustrated in FIG. 1, for example.

In operation, the RTEM 230 may generate and/or handle one or more interactive event IDs that correspond to a particular set of fingerprints generated by the RTFSs 240, ..., 246. The RTEM 230 may have determined the interactive event IDs based on live event inputs, time-scheduled event inputs, and/or pre-recorded event inputs. The RTEM 230 may assign or associate the interactive event IDs to their appropriate fingerprints based on the synchronization of its operation to the operation of the RTFSs 240, ..., 246 via broadcast NTP. The RTEM 120 may also provide television network station identifiers and/or network timing information to the RTFSs 240, ..., 246. The RTFSs 240, ..., 246 may communicate the fingerprints, interactive event IDs, the television network station identifiers, and/or the network timing information to their corresponding fingerprint vendors.

The client or end-user devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100a in FIG. 2A may also illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

Referring to FIG. 2B, there is shown a portion 100b of the ACR system 100 that may comprise the end-user devices 260, ..., 266 and the fingerprint vendors 250, ..., 256 shown in FIG. 2A. Also shown are application data servers 270, an analytics module 272, a rules engine 274, a cloud-based content delivery network (CDN) 275, and a content management system (CMS) 276. In addition, FIG. 2B shows a user response module 280 and third-party partners/advertisers 282.

The application data servers 270 may comprise suitable logic, circuitry, code, and/or interfaces that may be operable to receive from a viewer device information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to call the CMS 276 for text, banners, graphics, overlays, and/or video, for example.

The application data servers 270 may also be operable to deliver event schedules to end-user devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., end-user devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the end-user devices. For example, content that may be delivered may comprise text, banners, graphics, overlays, and video. Other examples of content may comprise polls and fun facts, clips to share, games and trivia, and advertising content. These examples are provided by way of illustration and not of limitation. Accordingly, other examples of contents that may be utilized for user interactive events with the end-user devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets (graphics, banners, overlays, video, etc) from the CDN 275.

The analytics module 272 may comprise suitable logic, circuitry, code, and/or interfaces that may be operable to receive user interaction information from the application data servers 270 or directly from the viewing devices. The analytics module 272 may be operable to communicate with the fingerprint vendors 250, . . . , 256 to receive information and determine what is being watched or viewed in various viewer devices. The analytics module 272 may comprise one or more back-end databases to store, mange, and/or process user information.

In operation, content may be provided by the application data servers 270 to one of the end-user devices 260, . . . , 266 in response to receiving an interactive event ID, a network television station, device type, and other data from that viewer device. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on end-user devices. The advertisement servers may also be operable to support the tracking of user impressions and click-throughs and/or to perform other advertising-related functions.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways.

Figure 3A:
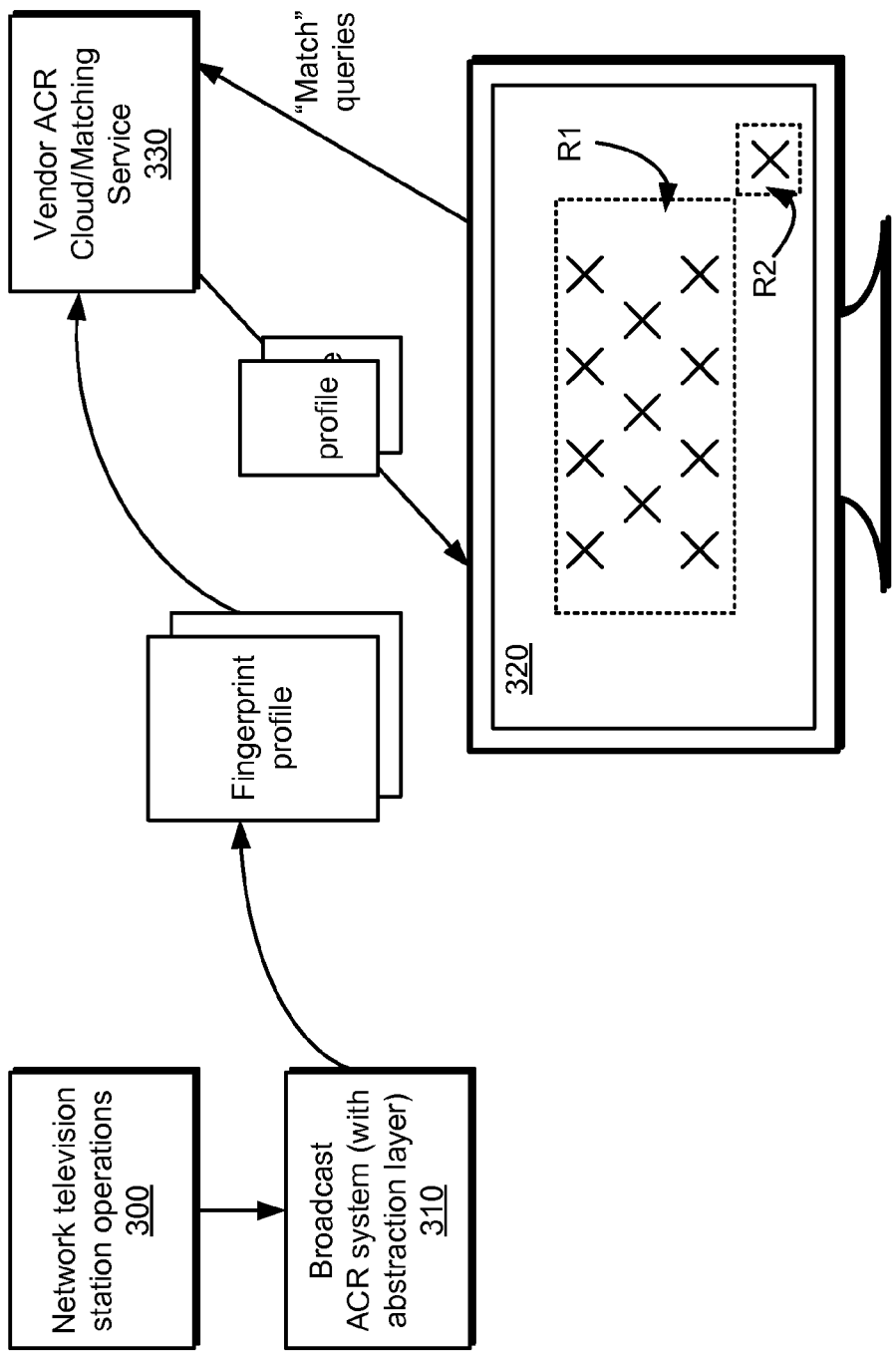
FIGS. 3A and 3B are a high-level functional of an exemplary work flow for an automatic content recognition with an abstraction layer, in accordance with an embodiment of the invention.
Figure 3B:
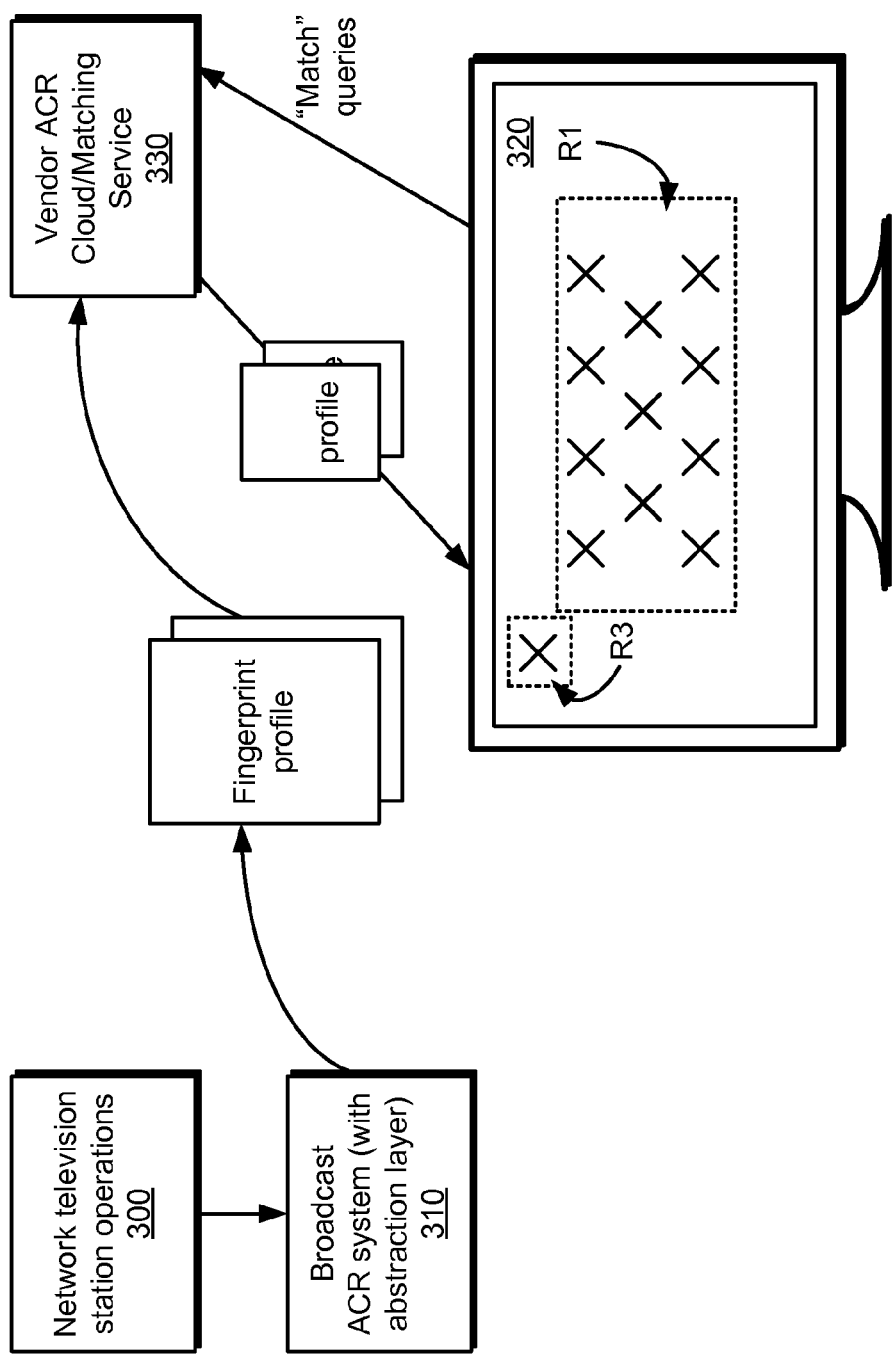

FIGS. 3A and 3B are each diagrams that illustrate exemplary scenarios for logo identification based on automatic content recognition, in accordance with embodiments of the invention. Referring to FIG. 3A, there is shown a network television station operations 300, an broadcast ACR system (with abstraction layer) 310, an end-user device 320 and a vendor ACR cloud/matching service or system 330.

The network television station operations 300 may comprise suitable logic, circuitry, code, and/or interfaces that may be operable to provide information to the broadcast ACR system (with abstraction layer) 310. The information provided may comprise information regarding the content or programming that is transmitted or broadcast to the end-user device 320. In this regard, the network television station operations 300 may provide an indication to the broadcast ACR system (with abstraction layer) 310 that the content received by the end-user device 320 may be content that is concurrently transmitted by one or more additional network television stations (e.g., State of the Union address). The network television station operations 300 may be operable to generate one or more signals that comprise the indication and to communicate the one or more signals to the broadcast ACR system (with abstraction layer) 310.

The broadcast ACR system (with abstraction layer) 310 may correspond to at least a portion of the ACR system 100 described above with respect to FIGS. 1-2B. The broadcast ACR system (with abstraction layer) 310 may be operable to generate a fingerprint profile for the end-user device 320. The fingerprint profile may comprise multiple fingerprinting locations and/or other information that may be utilized by the end-user device 320 to perform ACR fingerprinting on video content.

The end-user device 320 may comprise suitable logic, circuitry, code, and/or interfaces that may be operable to perform ACR fingerprinting based on a fingerprint profile. In this regard, a synchronous event manager on device may be operable to receive the profile information and request the embedded ACR subsystem in end-user device 320 to execute sampling with the new profile. The end-user device 320 may be, for example, a smart or connected TV with built-in capabilities for ACR fingerprinting. In this regard, the end-user device 320 may correspond to one of the end-user devices described above with respect to FIGS. 1-2B.

The vendor ACR cloud/matching service or system 330 may comprise suitable logic, circuitry, code, and/or interfaces that may be operable to perform ACR related functions on the vendor side. The vendor ACR cloud/matching service or system 330 may comprise, for example, control functions and/or matching functions.

In operation, the broadcast ACR system (with abstraction layer) 310 may generate a fingerprint profile and may communicate the fingerprint profile to the end-user device 320 via the vendor ACR cloud/matching service or system 330. The end-user device 320 may utilize the fingerprint profile to take fingerprints in a first region, R1, of a video frame. As illustrated in FIG. 3A, there may be multiple fingerprinting locations (X) within R1 where the end-user device 320 may take fingerprints. The end-user device 320 may communicate the fingerprints to the broadcast ACR system (with abstraction layer) 310 to determine whether a match has occurred. If a match has occurred, that is, when the programming being watched with the end-user device 320 has been identified through ACR fingerprinting, the broadcast ACR system (with abstraction layer) 310 may then determine whether the source of the programming is known. When the source of the programming is not known or is uncertain or based upon a time schedule, the broadcast ACR system (with abstraction layer) 310 may generate a new fingerprint profile or a fingerprint profile update to send to the end-user device 320. The profile with logo may be issued by the ACR vendor and may be issued at a specific time as identified by the broadcast network.

The new fingerprint profile or a fingerprint profile update may comprise additional fingerprinting locations that correspond to a second region, R2, where the logo or symbol of the network television stations that provides the programming is typically placed. The end-user device 320 may take the additional fingerprints (along with the original) and may send those additional fingerprints to the broadcast ACR system (with abstraction layer) 310 for matching. In some instances, after receiving the additional fingerprinting locations, the end-user device 320 may query the broadcast ACR system (with abstraction layer) 310 to receive approval to utilize the additional fingerprinting locations.

When the logo or symbol fingerprints match those of the network television station associated with the broadcast ACR system (with abstraction layer) 310, the end-user device 320 may receive any interactive event identifiers that may be available for the programming being watched. That is, only when the logo displayed is identified as corresponding to the network television station associated with the broadcast ACR system (with abstraction layer) 310 may any interactive events related to the network television station occur on the end-user device 320.

In some embodiments of the invention, the network television station operations 300 may provide an indication to the broadcast ACR system (with abstraction layer) 310 that the programming provided to the end-user device 320 may be provided concurrently by other network television stations. When the same programming is provided by multiple sources, ACR fingerprinting may identify the content received but not the source of the content. In this instance, the fingerprint profile may comprise additional fingerprinting locations. The fingerprint profile may also comprise instructions to the end-user device 320 to utilize the additional fingerprinting locations automatically when the source of the programming is unknown or unclear. When such instructions are not provided to the end-user device 320 a priori, the end-user device 320 may query the broadcast ACR system (with abstraction layer) 310 to receive approval to utilize the additional fingerprinting locations.

Referring to FIG. 3B, there is shown the network television station operations 300, the broadcast ACR system (with abstraction layer) 310, the end-user device 320 and a vendor ACR cloud/matching service 330. When the ACR fingerprinting associated with R1 indicates that the content or programming being watched corresponds to a programming or schedule guide, for example, the placement of the logo or symbol of the network television station on a video frame may be different from the placement during other types of programming. In such instances, the additional fingerprinting locations provided by the broadcast ACR system (with abstraction layer) 310 may correspond to a third region, R3, where the logo or symbol of the network television station is typically placed when a programming or schedule guide is displayed.

FIG. 4A is a block diagram that illustrates an exemplary real-time event manager, in accordance with an embodiment of the invention. Referring to FIG. 4A, there is shown a real-time event manager (RTEM) 400 that may correspond to the RTEM 120 (FIG. 1), and the RTEM 230 (FIG. 2A), which are described above. The RTEM 400 may comprise a processor module 410, a memory module 420, a network module 430, and an input/output (I/O) interface module 440.

The processor module 410 may comprise suitable logic, circuitry, code, and/or interfaces that may be operable to perform the operations, functions, processes, computations, and the like described herein with respect to the RTEMs 120 and 230. In this regard, the processor module 410 may be operable to enable an abstraction layer utilized for supporting fingerprint technologies from different vendors.

The processor module 410 may be operable to handle events such as live events, time-scheduled events, and pre-recorded events. The processor module 410 may be operable to assign interactive event IDs or similar information to video and/or audio fingerprints generated by one or more RTFSs. Moreover, the processor module 410 may be operable to handle network timing information for synchronizing the operation of the RTFSs.

The processor module 410 may comprise at least one processing device 412. The processing device 412 may be a central processing unit (CPU), a digital signal processor (DSP), and/or other type of integrated circuit that may be utilized to perform data processing operations.

The memory module 420 may comprise suitable logic, circuitry, code, and/or interfaces that may be operable to store information utilized to enable the abstraction layer. The network module 430 may comprise suitable logic, circuitry, code, and/or interfaces that may be operable to allow the RTEM 400 to communicate with one or more RTFSs and/or with an offline infrastructure such as the offline fingerprint module 110 described above with respect to FIG. 1. The network module 430 may be operable to support one or more communication protocols such as wireline protocols and/or wireless protocols. The network module 430 may be operable to receive information related to time-scheduled events and/or pre-recorded events.

The I/O interface module 440 may comprise suitable logic, circuitry, code, and/or interfaces that may be operable to interact with one of more sources of interactive events information such as an interactive director, for example.

FIG. 4B is a block diagram that illustrates an exemplary real-time fingerprint server or RTFS, in accordance with an embodiment of the invention. Referring to FIG. 4B, there is shown an RTFS 450 that may correspond to one of the RTFSs 122, . . . , 124 or one of the RTFSs 240, . . . , 246 described above. The RTFS 450 may comprise a processor module 460, a memory module 470, and a network module 480.

The processor module 460 may comprise suitable logic, circuitry, code, and/or interfaces that may be operable to perform the operations, functions, processes, computations, and the like described herein with respect to the RTFSs 122, . . . , 124 and the RTFSs 240, . . . , 246. In this regard, the processor module 460 may be operable to perform fingerprinting operations for a vendor-specific technology that may be provided for broadcasting to the network module 480, for example. Since the processor module 460 or other similar module in one of the RTFSs may perform vendor-specific fingerprinting operations that are different from those in other RTFSs, the use of an abstraction layer at a real-time event trigger infrastructure may enable a simplified implementation of an ACR system capable that supports multiple RTFSs with different vendor-specific technologies.

The processor module 460 may be operable to perform ACR or fingerprinting computations on a network television feed for audio and/or video fingerprinting. In this regard, the processor module 460 may be operable to handle frame-by-frame fingerprinting operations, for example. Moreover, the processor module 460 may be operable to handle network timing information for synchronizing the operation of the RTFS 450 with that of a network time protocol server such as the network time protocol server 170.

The processor module 460 may comprise at least one processing device 462. The processing device 462 may be a CPU, a DSP, and/or other type of integrated circuit or ASIC that may be utilized to perform data processing operations.

The memory module 470 may comprise suitable logic, circuitry, code, and/or interfaces that may be operable to store information utilized to enable the abstraction layer. The memory module 470 may be operable to store information generated in connection with fingerprinting computations.

The network module 480 may comprise suitable logic, circuitry, code, and/or interfaces that may be operable to allow the RTFS 450 to communicate with a corresponding one of the fingerprint match systems 130 or with a corresponding one of the fingerprint vendors 250, . . . , 256 described above. The network module 480 may also be operable to support communication between the RTFS 450 and a network time protocol server such as the network time protocol server 500. The network module 480 may support one or more communication protocols such as wireline protocols and/or wireless protocols.

Figure 5A:
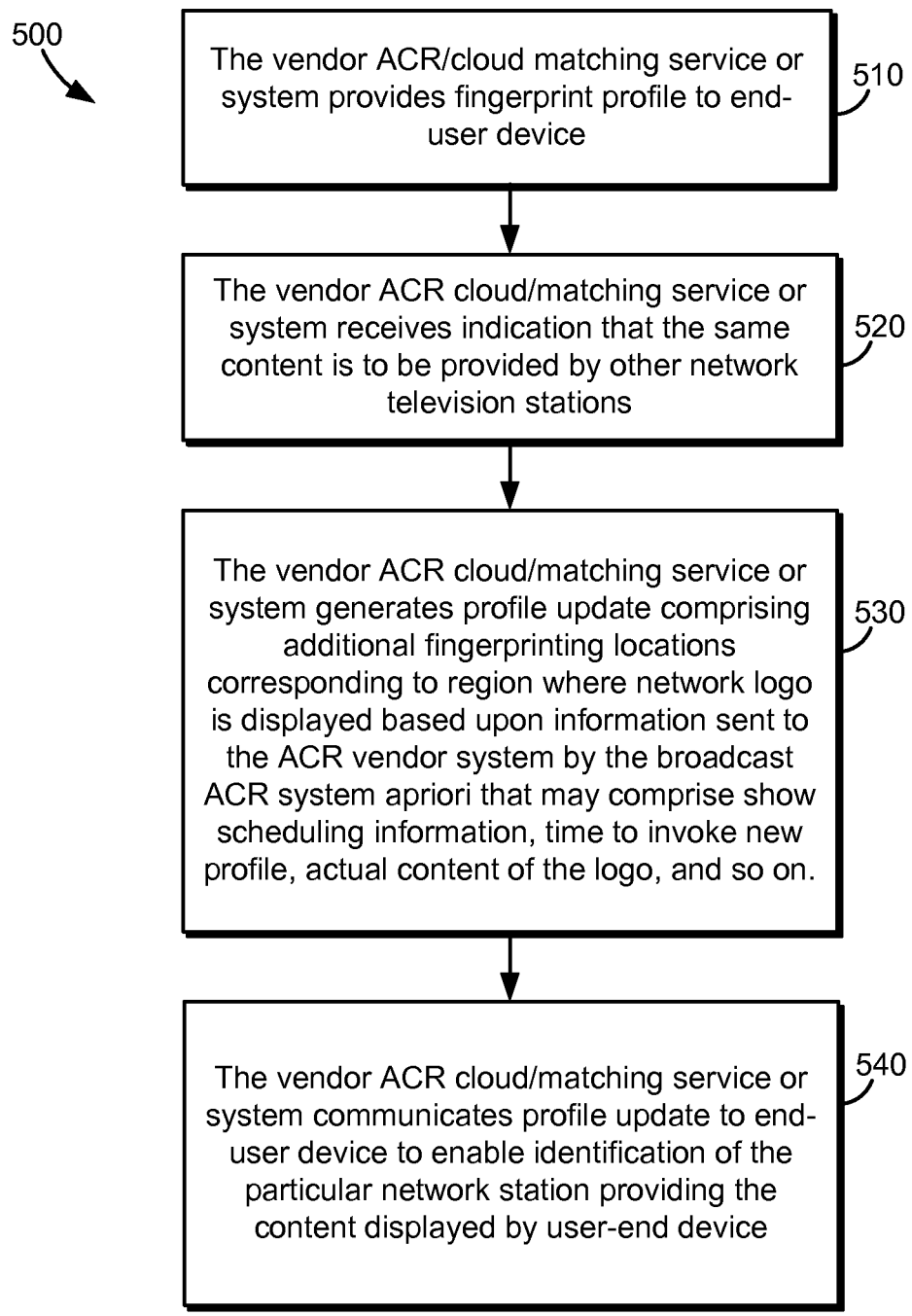
FIG. 5A is a block diagram that illustrates an exemplary real-time event manager (RTEM), in accordance with an embodiment of the invention.
Figure 5B:
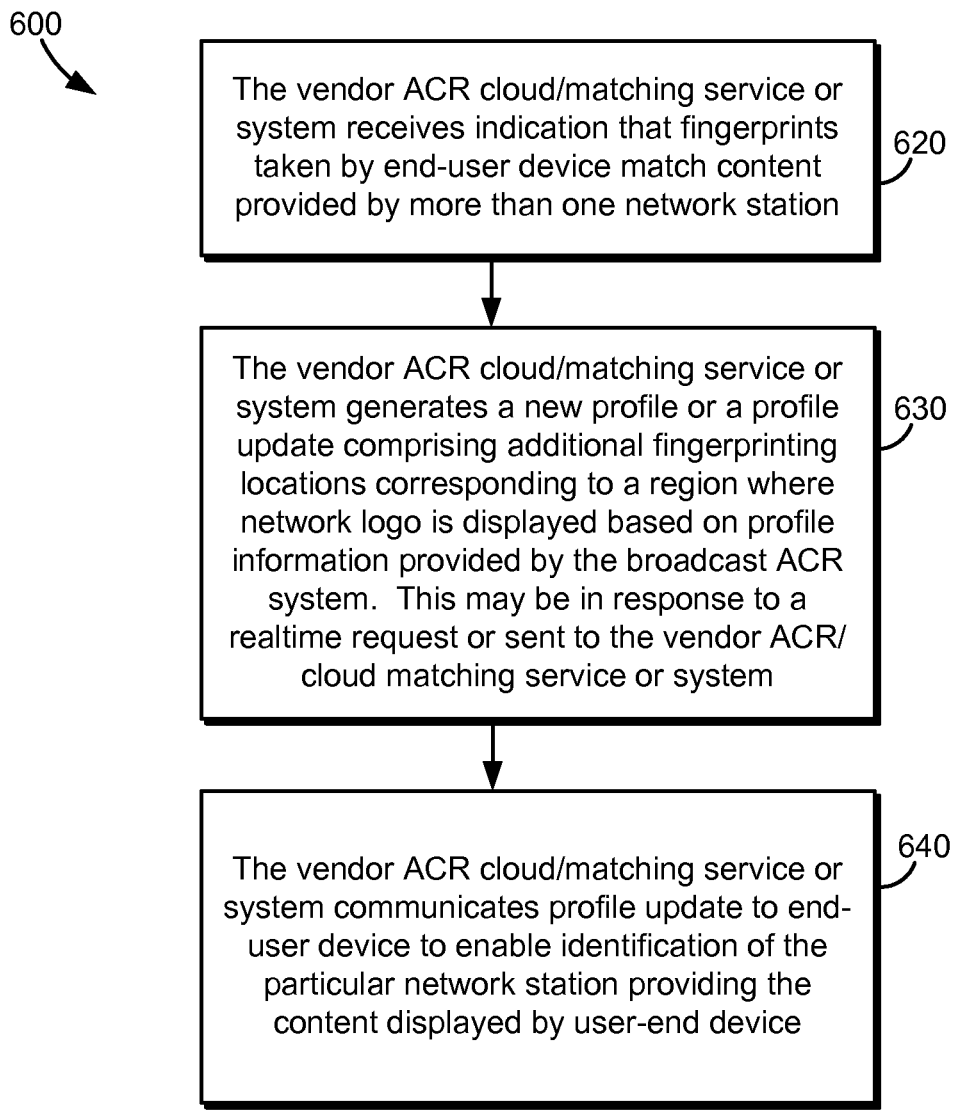
FIG. 5B is a block diagram that illustrates an exemplary real-time fingerprint server, in accordance with an embodiment of the invention.
Figure 6:
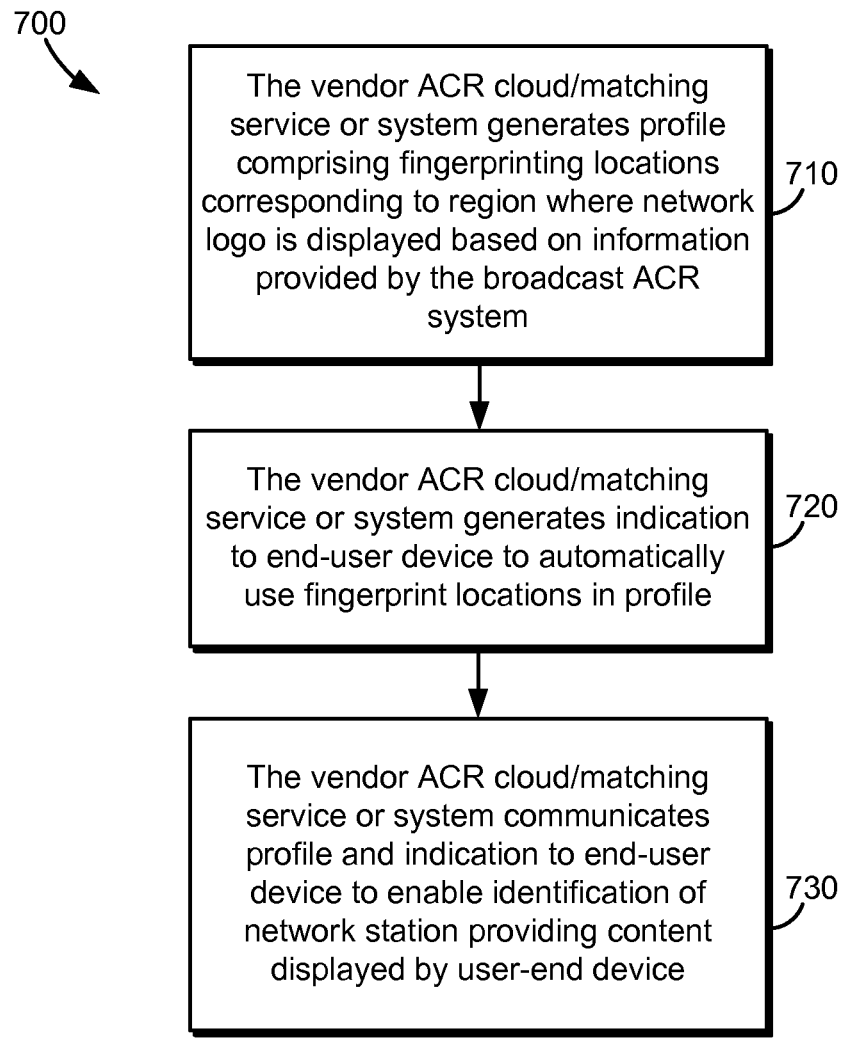
FIG. 6 is a flow diagram that illustrates exemplary steps in the generation and assignment of event identifiers for triggering interactive events in an automatic content recognition system with an abstraction layer, in accordance with an embodiment of the invention.

FIGS. 5A, 5B and 6 are each a flow diagram that illustrates exemplary steps for logo identification based on automatic content recognition, in accordance with various embodiments of the invention.

FIG. 5A is a block diagram that illustrates an exemplary real-time event manager (RTEM), in accordance with an embodiment of the invention. Referring to FIG. 5A, there is shown a flow chart 500 in which, at step 510, an vendor ACR system such as the vendor ACR cloud/matching service or system 330 described above, may provide a fingerprint profile to an end-user device 320. At step 520, the vendor system such as the vendor ACR cloud/matching service or system 330 may receive an indication that the same content that is being provided to the end-user device is concurrently provided by other network television stations, such as, for example, the State of the Union address. This may occur via a plurality of concurrent matches of the same content or via a flag or other indicator in the schedule or program guide.

At step 530, the vendor system such as the vendor ACR cloud/matching service or system 330 may generate a new fingerprint profile or a fingerprint profile update that comprises additional fingerprinting locations that correspond to the region in a video frame where the logo or symbol of the network television station is typically displayed. This may be based upon information sent to the vendor ACR system, such as the vendor ACR cloud/matching service or system 330, by the broadcast ACR system 310 apriori that may comprise show or program scheduling information, a time to invoke new profile, an actual content of the logo, and so on. The location may be different based on the content. For example, for newscasts or other regular programming, the logo may be typically placed on the lower right-hand corner of the video frame. On the other hand, for a programming guide, the logo may be typically placed on the upper left-hand corner of the video frame. In some embodiments of the invention, the additional fingerprinting locations may correspond to more than one region, where each region is related to one of the typical placements of the logo or symbol of the network television station.

At step 540, the vendor ACR system such as the vendor ACR cloud/matching service or system 330 communicates the new fingerprint profile or fingerprint profile to the end-user device to enable identification of the particular network television station providing the content.

FIG. 5B is a block diagram that illustrates an exemplary real-time fingerprint server, in accordance with an embodiment of the invention. Referring to FIG. 5B, there is shown a flow chart 600 in which, at step 620, a vendor ACR system such as the vendor ACR cloud/matching service or system 330 may receive an indication that the same content that is being provided to the end-user device is also provided by other network television stations. An example is when a program or show is syndicated and is available at the same time of day from multiple network television stations. The indication may result when, for example, fingerprints taken by the end-user device of the program or show result in multiple matches in a database.

At step 630, the vendor ACR system such as the vendor ACR cloud/matching service or system 330 may generate a new profile or a profile update comprising additional fingerprinting locations corresponding to a region where network logo is displayed based on profile information provided by the broadcast ACR system. This may be in response to a realtime request or sent to the vendor ACR/cloud matching service or system. In this regard, the vendor ACR cloud/matching service or system 330 may generate a new fingerprint profile or a fingerprint profile update that comprises additional fingerprinting locations that correspond to the region in a video frame where the logo or symbol of the network television station is typically displayed. At step 640, the vendor ACR system such as the vendor ACR cloud/matching service or system 330 communicates the new fingerprint profile or fingerprint profile update to the end-user device to enable identification of the particular network television station providing the content displayed by the end-user device.

FIG. 6 is a flow diagram that illustrates exemplary steps in the generation and assignment of event identifiers for triggering interactive events in an automatic content recognition system with an abstraction layer, in accordance with an embodiment of the invention.

Referring to FIG. 6, there is shown a flow chart 700 in which, at step 710, an vendor ACR system such as the vendor ACR cloud/matching service or system 330 described above, may generate a fingerprint profile for an end-user device. The fingerprint profile may comprise one or more fingerprinting locations that correspond to a region where the logo or symbol of the network television station associated with the ACR system is typically displayed based upon information that may be provided by the broadcast ACR system 310.

At step 720, the vendor ACR system such as the vendor ACR cloud/matching service or system 330 may generate an indication that the end-user device may automatically utilize the fingerprinting locations corresponding to the region where the logo is displayed when the network television station identity is not known or is unclear. At step 730, the vendor ACR system such as the vendor ACR cloud/matching service or system 330 may communicate the fingerprint profile and the indication the end-user device to enable identification of the particular network television station providing the content. In some instances, the indication may be part of the fingerprint profile.

In an embodiment of the invention, a device in an broadcast ACR system such as the ACR system 100 or the broadcast ACR system (with abstraction layer) 310 may be operable to handle automatic content recognition operations and to generate one or more signals that provide instructions. The device may be an real-time event manager (e.g., real-time event manager 120), a RTFS (e.g., RTFSs 122, . . . , 124, RTFSs 240, . . . , 244), and/or some other portion of an ACR system, for example. The instructions may comprise instructions to determine one or more locations in a video frame to take fingerprints. The one or more locations may correspond to a pre-determined or dynamically determined portion of the video frame in which a graphical item that represents a network television station may be displayed. The graphical item may comprise one or more of a logo, a symbol, a sign, a watermark, and text that represent the network television station.

The instructions may comprise instructions to generate a profile (e.g., fingerprint profile) comprising the determined one or more locations. The instructions may also comprise instructions to send the generated profile for communication to an end-user device, wherein the end-user device is operable to utilize the profile to take fingerprints of content provided by the network television station. An example of such an end-user device is one of the end-user devices 140 in FIG. 1, one of the end-user devices 260, . . . , 264 in FIGS. 2A and 2B, and the end-user device 320 in FIGS. 3A and 3B.

The signals generated by the broadcast ACR system 310 may also provide instructions to generate an indication that the determined one or more locations are to be automatically utilized by the end-user device to take fingerprints when one or more fingerprints previously taken by the end-user device match fingerprints that correspond to content provided by the network television station. The instructions may also provide that the generated indication be sent for communication to the end-user device.

In another aspect of the invention, the device may be operable to receive an indication that one or more fingerprints previously taken by the end-user device match fingerprints that correspond to content provided by the network television station and, in response to the received indication, the generated one or more signals may provide instructions to a portion of the vendor ACR system such as the vendor ACR cloud/matching service or system 330 to generate the profile. In general, the vendor ACR system such as the vendor ACR cloud/matching service or system 330 is operable to issue profile instructions.

In another aspect of the invention, the broadcast ACR system 310 may be operable to generate one or more additional signals that provide instructions. These instructions may comprise instructions to generate additional profiles at a pre-determined rate. The pre-determined rate may be approximately one profile every five seconds or to keep a given profile active until further notice. Each additional profile may comprise one or more locations in a video frame to take fingerprints. The one or more locations of each additional profile may correspond to a pre-determined or dynamically determined portion of the video frame in which a graphical item that represents the network television station is displayed. These instructions may also comprise instructions to send the generated additional profiles for communication to the end-user device.

In another aspect of the invention, the device may be operable to receive an indication that the content provided by the network television station is provided concurrently by other network television stations and, in response to the received indication, the generated one or more signals may provide instructions to a portion of the ACR system to generate the profile. The indication may be provided by, for example, the network television station operations 300 shown in FIGS. 3A and 3B.

In another aspect of the invention, the broadcast ACR system 310 may be operable to receive an indication that one or more fingerprints previously taken by the end-user device match fingerprints that correspond to content provided by the network television station and also match content provided by one or more additional network television stations. In this scenario, the vendor ACR system such as the vendor ACR cloud/matching service or system 330 may be operable to query the Broadcast ACR system in real time to retrieve a updated fingerprint profile. The updated profile which may comprise information regarding location of specific logos, pointers to the logo itself (as a file), and various other instructions (time to invoke, auto invoke, etc) is sent to the ACR vendor's control server. The ACR vendor's control server sends the updated profile to the TV and/or end user device. In another embodiment of the invention, the broadcast ACR system 310 may be operable to send the enhanced profile information in advance of potential multi-matches and permit the vendor ACR system such as the vendor ACR cloud/matching service or system 330 to automatically invoke the profiles as necessary upon detection of multi-matches against networks which enhanced fingerprint profiles exist. In response to the received indication, the one or more signals generate by the device may provide instructions to a portion of the ACR system to generate the profile.

With respect to the various aspects of the invention described above, the profile may comprise a plurality of locations in the video frame to take fingerprints that correspond to a portion of the video frame that is different from the pre-determined portion of the video frame in which the graphical item is displayed. The plurality of locations could comprise from about 16 locations to about 36 locations or possibly more.

In various embodiments of the invention, a method and system, for providing logo identification based on automatic content recognition comprises a device that is operable to handle automatic content recognition operations and to generate one or more signals that provide instructions to determine one or more locations in a video frame to take fingerprints, wherein the one or more locations correspond to a determined portion of the video frame in which a graphical item that represents a network television station is displayed. The generated one or more signals may provide instructions to generate a profile comprising the determined one or more locations, and to send the generated profile for communication to an end-user device, wherein the end-user device is operable to utilize the profile to take fingerprints of content provided by the network television station. The graphical item comprises one or more of a logo, a symbol, a sign, a watermark, and text that represent the network television station.

The generated one or more signals may also provide instructions to generate an indication that the determined one or more locations are to be automatically utilized by the end-user device to take fingerprints when one or more fingerprints previously taken by the end-user device match fingerprints that correspond to content provided by the network television station. The generated one or more signals may also provide instructions to send the generated indication for communication to the end-user device.

The device may also be operable to receive an indication that one or more fingerprints previously taken by the end-user device match fingerprints that correspond to content provided by the network television station. In response to the received indication, the generated one or more signals provide instructions to generate the profile. The device is operable to generate one or more additional signals that provide instructions to generate additional profiles at a determined rate, wherein each additional profile comprises one or more locations in a video frame to take fingerprints. The one or more locations of each additional profile corresponds to a determined portion of the video frame in which a graphical item that represents the network television station is displayed. The generated additional profiles for communication maybe sent to the end-user device.

An exemplary determined rate is approximately one profile every five seconds. Other rates, whether lesser or greater may also be utilized without departing from the spirit and scope of the invention.

The device may also be operable to receive an indication that the content provided by the network television station is provided concurrently by other network television stations. In response to the received indication, the generated one or more signals provide instructions to generate the profile. The device may receive an indication that one or more fingerprints previously taken by the end-user device match fingerprints that correspond to content provided by the network television station and also match content provided by one or more additional network television stations. In response to the received indication, the generated one or more signals provide instructions to generate the profile. The profile may comprise a plurality of locations in the video frame to take fingerprints that correspond to a portion of the video frame that is different from the determined portion of the video frame in which the graphical item is displayed.

Another embodiment of the invention may comprise a server or computer system that is operable receive an indication that one or more fingerprints previously taken by an end-user device match fingerprints that correspond to content provided by a network television station. In response to the received indication, one or more instructions may be generated to generate a profile comprising one or more locations in a video frame that correspond to a determined portion of the video frame in which a graphical item that represents the network television station is displayed. One or more instructions may also be generated to send the generated profile for communication to the end-user device, wherein the end-user device is operable to utilize the profile to take fingerprints of content provided by the network television station.

Another embodiment of the invention may provide a non-transitory machine and/or computer readable storage and/or media, having stored thereon, a machine code and/or a computer program having at least one code section executable by a machine and/or a computer, thereby causing the machine and/or computer to perform the steps as described herein for logo identification based on automatic content recognition.

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Another embodiment of the invention may provide a non-transitory machine and/or computer readable storage and/or media, having stored thereon, a machine code and/or a computer program having at least one code section executable by a machine and/or a computer, thereby causing the machine and/or computer to perform the steps as described herein for logo identification based on automatic content recognition.

Accordingly, the present invention may be realized in hardware, software, or a combination of hardware and software. The present invention may be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a device that is operable to handle operations for automatic content recognition, the device being operable to:
   receive multiple sequences of video fingerprints that are generated from identical segments of a video feed utilizing a plurality of different fingerprint technologies; and
   time assignment of event identifiers to the multiple sequences of video fingerprints that are generated from the identical segments of the video feed such that same event identifiers are assigned to each of the multiple sequences of video fingerprints that are generated from the identical segments of the video feed by the different video fingerprint technologies utilizing a common reference clock:
   generating one or more signals that provide instructions to:
      determine one or more locations in a video frame to take fingerprints, wherein the one or more locations correspond to a determined portion of the video frame in which a graphical item that represents a network television station is displayed;
      generate a profile comprising the determined one or more locations; and
      send the generated profile for communication to an end-user device, wherein the end-user device is operable to utilize the profile to take fingerprints of content provided by the network television station.

2. The method of claim 1, wherein the graphical item comprises one or more of a logo, a symbol, a sign, a watermark, and text that represent the network television station.

3. The method of claim 1, wherein the generated one or more signals provide instructions to:
   generate an indication that the determined one or more locations are to be automatically utilized by the end-user device to take fingerprints when one or more fingerprints previously taken by the end-user device match fingerprints that correspond to content provided by the network television station; and
   send the generated indication for communication to the end-user device.

4. The method of claim 1, comprising:
   receiving an indication that one or more fingerprints previously taken by the end-user device match fingerprints that correspond to content provided by the network television station; and
   in response to the received indication, the generated one or more signals provide instructions to generate the profile.

5. The method of claim 1, comprising:
generating one or more additional signals that provide instructions to:
generate additional profiles at a determined rate, wherein:
each additional profile comprises one or more locations in a video frame to take fingerprints; and
the one or more locations of each additional profile corresponds to a determined portion of the video frame in which a graphical item that represents the network television station is displayed; and
send the generated additional profiles for communication to the end-user device.

6. The method of claim 5, wherein the determined rate is approximately one profile every five seconds.

7. The method of claim 1, comprising:
receiving an indication that the content provided by the network television station is provided concurrently by other network television stations; and
in response to the received indication, the generated one or more signals provide instructions to generate the profile.

8. The method of claim 1, comprising:
receiving an indication that one or more fingerprints previously taken by the end-user device match fingerprints that correspond to content provided by the network television station and also match content provided by one or more additional network television stations; and
in response to the received indication, the generated one or more signals provide instructions to generate the profile.

9. The method of claim 1, wherein the profile comprises a plurality of locations in the video frame to take fingerprints that correspond to a portion of the video frame that is different from the determined portion of the video frame in which the graphical item is displayed.

10. The method of claim 9, wherein the plurality of locations comprise from about 16 locations to about 36 locations.

11. The method according to claim 1, wherein the video feed comprises a live feed.

12. The method according to claim 1, wherein the video feed comprises previously ingested content.

13. A system, comprising:
a device that is operable to handle operations for automatic content recognition, the device being operable to:
receive multiple sequences of video fingerprints that are generated from identical segments of a video feed utilizing a plurality of different fingerprint technologies; and
time assignment of event identifiers to the multiple sequences of video fingerprints that are generated from the identical segments of the video feed same video content but with different fingerprint technologies such that same event identifiers are assigned to different sets each of the multiple sequences of video fingerprints that are generated from the identical segments of the video feed by the different video fingerprint technologies utilizing a common reference clock; and
generate one or more signals that provide instructions to:
determine one or more locations in a video frame to take fingerprints, wherein the one or more locations correspond to a determined portion of the video frame in which a graphical item that represents a network television station is displayed;
generate a profile comprising the determined one or more locations; and
send the generated profile for communication to an end-user device, wherein the end-user device is operable to utilize the profile to take fingerprints of content provided by the network television station.

14. The system of claim 13, wherein the graphical item comprises one or more of a logo, a symbol, a sign, a watermark, and text that represent the network television station.

15. The system of claim 13, wherein the generated one or more signals provide instructions to:
generate an indication that the determined one or more locations are to be automatically utilized by the end-user device to take fingerprints when one or more fingerprints previously taken by the end-user device match fingerprints that correspond to content provided by the network television station; and
send the generated indication for communication to the end-user device.

16. The system of claim 13, wherein device is operable to:
receive an indication that one or more fingerprints previously taken by the end-user device match fingerprints that correspond to content provided by the network television station; and
in response to the received indication, the generated one or more signals provide instructions to generate the profile.

17. The system of claim 13, wherein the device is operable to:
generate one or more additional signals that provide instructions to:
generate additional profiles at a determined rate, wherein:
each additional profile comprises one or more locations in a video frame to take fingerprints; and
the one or more locations of each additional profile corresponds to a determined portion of the video frame in which a graphical item that represents the network television station is displayed; and
send the generated additional profiles for communication to the end-user device.

18. The system of claim 17, wherein the determined rate is approximately one profile every five seconds.

19. The system of claim 13, wherein the device is operable to:
receive an indication that the content provided by the network television station is provided concurrently by other network television stations; and
in response to the received indication, the generated one or more signals provide instructions to generate the profile.

20. The system of claim 13, wherein the device is operable to:
receive an indication that one or more fingerprints previously taken by the end-user device match fingerprints that correspond to content provided by the network television station and also match content provided by one or more additional network television stations; and
in response to the received indication, the generated one or more signals provide instructions to generate the profile.

21. The system of claim 13, wherein the profile comprises a plurality of locations in the video frame to take fingerprints that correspond to a portion of the video frame that is different from the determined portion of the video frame in which the graphical item is displayed.

22. The system according to claim 13, wherein the video feed comprises a live feed.

23. The system according to claim 13, wherein the video feed comprises previously ingested content.

24. A system, comprising:
a broadcast automatic content recognition (ACR) system that is operable to time assignment of event identifiers to multiple sequences of video fingerprints that are generated from the same video content but with different fingerprint technologies such that same event identifiers are assigned to different sets of video fingerprints that are generated by the different video fingerprint technologies, the broadcast ACR system being operable to:
receive an indication that one or more fingerprints previously taken by an end-user device match fingerprints that correspond to content provided by a network television station; and
in response to the received indication, generate one or more instructions to:
generate a profile comprising one or more locations in a video frame that correspond to a determined portion of the video frame in which a graphical item that represents the network television station is displayed; and
send the generated profile for communication to the end-user device, wherein the end-user device is operable to utilize the profile to take fingerprints of content provided by the network television station;
receive a query from a vendor ACR system for an updated fingerprint profile; and
send the updated fingerprint profile from the broadcast ACR system to the vendor ACR system, wherein the vendor ACR system sends the updated fingerprint profile to the end-user device.

25. A non-transitory computer-readable medium for a device that handles operations for automatic content recognition, the device being operable to:
receive multiple sequences of video fingerprints that are generated from identical segments of a video feed utilizing a plurality of different fingerprint technologies; and
time assignment of event identifiers to the multiple sequences of video fingerprints that are generated from the identical segments of the video feed such that same event identifiers are assigned to each of the multiple sequences of video fingerprints that are generated from the identical segments of the video feed by the different video fingerprint technologies utilizing a common reference clock; and
the device comprising code for:
generating one or more signals that provide instructions to:
determine one or more locations in a video frame to take fingerprints, wherein the one or more locations correspond to a determined portion of the video frame in which a graphical item that represents a network television station is displayed;
generate a profile comprising the determined one or more locations; and
send the generated profile for communication to an end-user device, wherein the end-user device is operable to utilize the profile to take fingerprints of content provided by the network television station.

26. A system, comprising:
a broadcast automatic content recognition (ACR) system that is operable to:
receive multiple sequences of video fingerprints that are generated from identical segments of a video feed utilizing a plurality of different fingerprint technologies; and
time assignment of event identifiers to the multiple sequences of video fingerprints that are generated from the identical segments of the video feed such that same event identifiers are assigned to each of the multiple sequences of video fingerprints that are generated from the identical segments of the video feed by the different video fingerprint technologies utilizing a common reference clock, the broadcast ACR system being operable to:
receive an indication that one or more fingerprints previously taken by an end-user device match fingerprints that correspond to content provided by a network television station; and
in response to the received indication, generate one or more instructions to:
generate a profile comprising one or more locations in a video frame that correspond to a determined portion of the video frame in which a graphical item that represents the network television station is displayed; and
send the generated profile for communication to the end-user device, wherein the end-user device is operable to utilize the profile to take fingerprints of content provided by the network television station;
receive a query from a vendor ACR system for an updated fingerprint profile; and
send the updated fingerprint profile from the broadcast ACR system to the vendor ACR system, wherein the vendor ACR system sends the updated fingerprint profile to the end-user device.

* * * * *